Dec. 21, 1948. L. W. PRAY 2,457,089
SPINDLE BRAKE MECHANISM
Filed Feb. 1, 1946
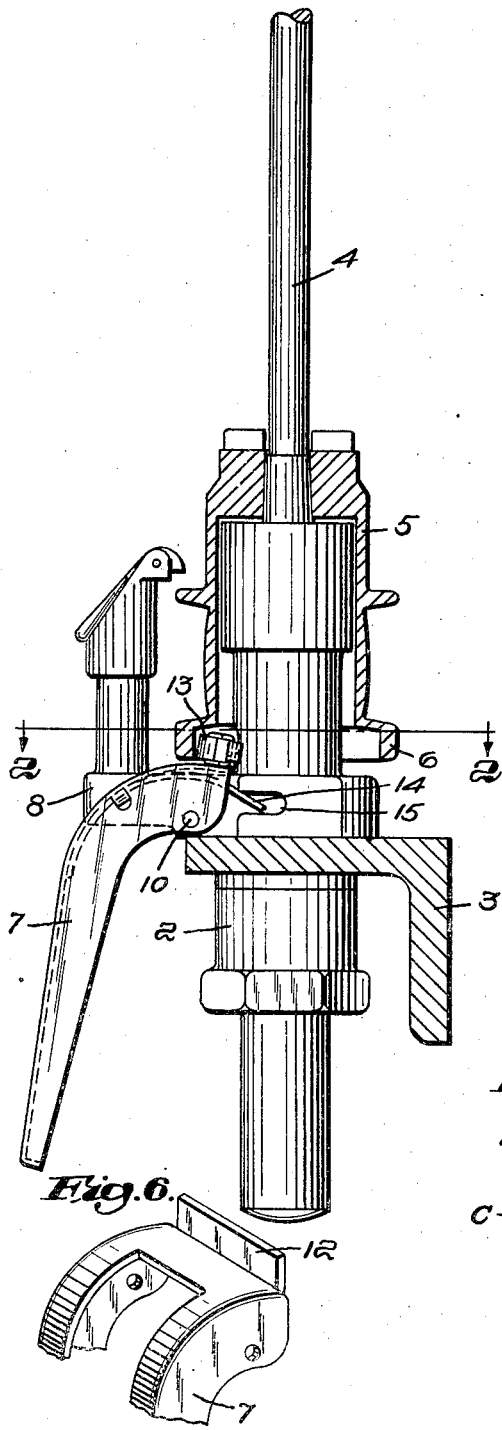
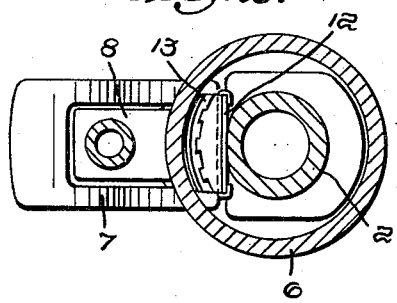
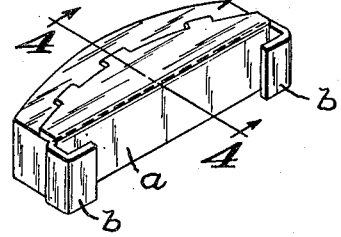
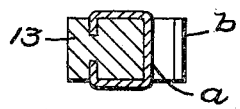

Patented Dec. 21, 1948

2,457,089

UNITED STATES PATENT OFFICE 2,457,089

SPINDLE BRAKE MECHANISM

Lester W. Pray, Saco, Maine, assignor to Saco-Lowell Shops, Boston, Mass., a corporation of Maine Application February 1, 1946, Serial No. 644,965

2 Claims. (Cl. 57—88)

1

This invention relates to spindles of the type used in spinning and twister frames. It is the chief object of the invention to devise a brake structure for spindles of this character which will be exceptionally reliable in operation and in which the friction element of the brake mechanism can be replaced quickly without the use of special tools.

The nature of the invention will be readily understood from the following description when read in connection with the accompanying drawings, and the novel features will be particularly pointed out in the appended claims.

In the drawings,

Fig. 1 is a side elevation, with some parts in section, showing a spindle structure embodying this invention;

Fig. 2 is a sectional view taken substantially on the line 2—2, Fig. 1, the blade, however, being omitted;

Fig. 3 is a perspective view of one form of brake shoe adapted for use in the brake mechanism provided by this invention;

Fig. 4 is a sectional view on the line 4—4, Fig. 3;

Fig. 5 is a perspective view of another form of brake shoe which may be substituted for that shown in Figs. 3 and 4; and Fig. 6 is a perspective view showing certain details of the brake lever.

The construction shown in the drawings comprises a spindle base 2 mounted in the usual manner on a spindle rail 3. A blade 4 is supported in said base for rotation around its own axis and carries a whirl 5 rigidly secured thereon. So far as this general organization of parts is concerned, it is substantially like those commonly used in spinning or twister frames.

According to the present invention the whirl 5 is provided with an annular skirt 6 projecting downwardly from the main body thereof and the inner surface of this skirt is utilized as a braking surface. The brake mechanism comprises a lever 7 preferably made of sheet metal and provided with downwardly bent side portions which straddle the oil well extension 8 of the spindle base, and are secured to it by the pivot pin 10. The end portion of this lever above the pivot 10 is provided with an up-turned lip or tang 12, best shown in Fig. 6, and the brake shoe 13, Figs. 2, 3 and 4, is fastened to this tang so that it can be readily removed from it. In the particular construction shown the friction element of the brake is cut or molded to the desired shape, and a metal retaining member $a$ is clinched on to it and is provided with ears $b$—$b$, Figs. 3 and 4, which are adapted to slide down over the ends of the tang 12 into a releasable interlocking relation to those ends, as clearly shown in Fig. 2.

Normally the "pad" or body part of the lever 7 is held in its outward position, as shown in Fig. 1, by means of a leaf spring 14 which is secured to the inner curved surface of the lever 7 and has

2 a free end portion projecting into a slot 15 formed in the base 2. The tendency of this spring to assume a straight position causes it to hold the lever 7 outwardly, and the brake shoe 13 inwardly, out of contact with the inner surface of the skirt 6. By pressing inwardly on the lever 7 the brake shoe 13 is swung outwardly into engagement with the inner surface of the skirt 6 and stops the rotation of the spindle blade. As soon as the lever is released the spring 14 automatically returns it to its inoperative or inactive position.

When the brake shoe 13 becomes worn, it can be removed simply by lifting the blade 4 and its whirl 5 far enough to permit the operator to slip the worn shoe off the tang 12 and position a new one on it. The whirl then is allowed to drop into its running position and the spindle is ready for normal operation again.

Another form of brake shoe which may be used in place of that shown at 13 is illustrated at 16 in Fig. 5. It is a molded body of friction material shaped to fit on the tang 12 and provided with slots $c$—$c$ to receive the ends of said tang.

Having thus described my invention, what I desire to claim as new is:

1. In a spindle structure, the combination with a spindle blade, a whirl secured fast thereon and a base in which said blade is mounted for rotation, said whirl being provided with a downwardly extending circular skirt of a lever fulcrumed on said base at the forward side of the spindle, said lever having an end portion positioned inside the skirt of said whirl, and a brake shoe releasably interlocked with the end portion of said lever and positioned for engagement with the inner surface of said skirt to stop rotation of the spindle.

2. In a spindle structure, the combination with a spindle blade, a whirl secured fast thereon and a base in which said blade is mounted for rotation, said whirl being provided with a downwardly extending circular skirt of a lever fulcrumed on said base at the forward side of the spindle, said lever having a tang extending upwardly inside the skirt of said whirl, and a brake shoe supported on said tang and positioned for engagement with the inner surface of said skirt to stop rotation of the spindle, said shoe being slotted to receive said tang and being removable from the latter by lifting it off the tang.

LESTER W. PRAY.

REFERENCES CITED

The following references are of record in the file of this patent:

UNITED STATES PATENTS

| Number | Name | Date |
| --- | --- | --- |
| 701,138 | Boyd | May 27, 1902 |
| 1,338,600 | Underwood | Apr. 27, 1920 |
| 2,168,249 | Staufert | Aug. 1, 1939 |
| 2,245,423 | Winslow | June 10, 1941 |
| 2,320,565 | Cabot | June 1, 1943 |